United States Patent
Xiao et al.

(10) Patent No.: US 11,094,998 B2
(45) Date of Patent: Aug. 17, 2021

(54) CERAMIC-COATED SEPARATORS FOR LITHIUM-CONTAINING ELECTROCHEMICAL CELLS AND METHODS OF MAKING THE SAME

(71) Applicant: GM GLOBAL TECHNOLOGY OPERATIONS LLC, Detroit, MI (US)

(72) Inventors: Xingcheng Xiao, Troy, MI (US); Jiagang Xu, Warren, MI (US); Mei Cai, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 29 days.

(21) Appl. No.: 16/445,610

(22) Filed: Jun. 19, 2019

(65) Prior Publication Data

US 2020/0403204 A1  Dec. 24, 2020

(51) Int. Cl.
*H01M 2/16* (2006.01)
*H01M 50/431* (2021.01)
(Continued)

(52) U.S. Cl.
CPC ............ *H01M 50/431* (2021.01); *B05D 1/12* (2013.01); *C04B 35/50* (2013.01);
(Continued)

(58) Field of Classification Search
CPC .. H01M 2/1646; H01M 2/145; H01M 2/1686; B05D 1/12; C04B 35/50
See application file for complete search history.

(56) References Cited

U.S. PATENT DOCUMENTS 6,632,561 B1 * 10/2003 Bauer ................... H01M 4/621
429/144
7,175,937 B2   2/2007 Cho et al.
(Continued)

FOREIGN PATENT DOCUMENTS

CN    101696015 A    4/2010
JP    3466045 B2    11/2003
(Continued)

OTHER PUBLICATIONS

Ren et al, "Novel Slurry Electrolyte Containing Lithium Metasilicate for High Electrochemical Performance of a 5 V Cathode", Applied Materials and Interfaces, 7, 22898-22906 (2015). (Year: 2015).*

(Continued)

*Primary Examiner* — Amanda C. Walke
(74) *Attorney, Agent, or Firm* — Harness, Dickey & Pierce, P.L.C.

(57) ABSTRACT

A ceramic-coated separator for a lithium-containing electrochemical cell and methods of preparing the ceramic-coated separator are provided. The ceramic-coated separator may be manufactured by preparing a slurry that includes one or more lithiated oxides and a binder and disposing the slurry onto one or more surfaces of a porous substrate. The slurry may be dried to from a ceramic coating on the one or more surfaces of the porous substrate so as to create the ceramic-coated separator. The ceramic coating may include one or more lithiated oxides selected from $Li_2SiO_3$, $LiAlO_2$, $Li_2TiO_3$, $LiNbO_3$, $Li_3PO_4$, $Li_2CrO_4$, and $Li_2Cr_2O_7$.

19 Claims, 4 Drawing Sheets

(51) Int. Cl.
*H01M 50/403* (2021.01)
*H01M 50/449* (2021.01)
*B05D 1/12* (2006.01)
*C04B 35/50* (2006.01)
*H01M 10/0525* (2010.01)

(52) U.S. Cl.
CPC ....... *H01M 50/403* (2021.01); *H01M 50/449* (2021.01); *H01M 10/0525* (2013.01); *H01M 2220/20* (2013.01)

(56) References Cited

U.S. PATENT DOCUMENTS

| | | | |
|---|---|---|---|
| 8,197,707 B2* | 6/2012 | Lefenfeld | C01C 1/026 |
| | | | 252/182.1 |
| 8,663,840 B2 | 3/2014 | Nazri et al. | |
| 8,932,746 B2 | 1/2015 | Maeda et al. | |
| 8,974,946 B2 | 3/2015 | Cai et al. | |
| 8,999,584 B2 | 4/2015 | Jiang et al. | |
| 9,028,565 B2 | 5/2015 | Huang | |
| 9,093,705 B2 | 7/2015 | Xiao et al. | |
| 9,123,939 B2 | 9/2015 | Xiao et al. | |
| 9,142,830 B2 | 9/2015 | Xiao et al. | |
| 9,153,819 B2 | 10/2015 | Huang et al. | |
| 9,160,036 B2 | 10/2015 | Yang et al. | |
| 9,350,046 B2 | 5/2016 | Huang | |
| 9,350,047 B2* | 5/2016 | Yoshida | C04B 35/00 |
| 9,362,551 B2 | 6/2016 | Sachdev et al. | |
| 9,362,552 B2 | 6/2016 | Sohn et al. | |
| 9,412,986 B2 | 8/2016 | Huang | |
| 9,455,430 B2 | 9/2016 | Huang et al. | |
| 9,537,144 B2 | 1/2017 | Huang et al. | |
| 9,590,245 B2* | 3/2017 | Tarascon | C01G 1/10 |
| 9,636,658 B2 | 5/2017 | Kim et al. | |
| 9,680,143 B2* | 6/2017 | Arnold | H01M 2/1686 |
| 9,970,711 B2* | 5/2018 | Iyer | C08K 3/105 |
| 9,991,491 B2* | 6/2018 | Lee | H01M 4/0404 |
| 10,062,898 B2 | 8/2018 | Xiao | |
| 2012/0229096 A1 | 9/2012 | Nazri | |
| 2012/0231321 A1 | 9/2012 | Huang et al. | |
| 2013/0284338 A1 | 10/2013 | Xiao et al. | |
| 2014/0272526 A1 | 9/2014 | Huang | |
| 2014/0272558 A1 | 9/2014 | Xiao et al. | |
| 2016/0111721 A1 | 4/2016 | Xiao et al. | |
| 2016/0380304 A1* | 12/2016 | Kim | C04B 35/50 |
| | | | 429/189 |
| 2017/0018815 A1* | 1/2017 | Laramie | H01M 2/1653 |
| 2018/0254449 A1 | 9/2018 | Xiao et al. | |
| 2018/0254531 A1 | 9/2018 | Xiao et al. | |
| 2020/0216361 A1* | 7/2020 | Karpenko | C04B 35/6342 |

FOREIGN PATENT DOCUMENTS

| | | |
|---|---|---|
| JP | 1784718 B2 | 10/2011 |
| KR | 20120003203 A | 1/2012 |

OTHER PUBLICATIONS

Teragawa et al, "Preparation of Li2SeP2S5solid electrolyte fromN-methylformamidesolution and application for all-solid-state lithium battery", Journal of Power Sources, 248, 939-942 (2014). (Year: 2014).*

Nunes-Pereira et al, "Polymer composites and blends for battery separators: State of the art,challenges and future trends", Journal of power Sources, 281,378-398 (2015) (Year: 2015).*

Raja et al, "Lithium aluminate-based ceramic membranes as separatorsfor lithium-ion batteries", Ceramics International, 41,3045-3050 (2015) (Year: 2015).*

Choi et al, "Improved Li-ion conductivity of 0.7Li4SiO4-0.3Li3PO4byaluminum doping", Solid State Ionics, 289, 173-179 (2016) (Year: 2016).*

Vetter, J. et al., "Ageing mechanisms in lithium-ion batteries," Journal of Power Sources, 147 (2005), pp. 269-281 (Published online: Mar. 14, 2005); DOI: 10.1016/j.jpowsour.2005.01.006.

* cited by examiner

CERAMIC-COATED SEPARATORS FOR LITHIUM-CONTAINING ELECTROCHEMICAL CELLS AND METHODS OF MAKING THE SAME

INTRODUCTION

This section provides background information related to the present disclosure which is not necessarily prior art.

The present disclosure relates generally to lithium-containing electrochemical cells and, more specifically, to ceramic coated separators for lithium-containing electrochemical cells and methods of manufacturing such separators. The ceramic coatings comprise one or more ionically conductive lithiated oxides that improve the high temperature performance of the lithium-containing electrochemical cells.

By way of background, high-energy density, electrochemical cells, such as lithium ion batteries can be used in a variety of consumer products and vehicles, such as Hybrid Electric Vehicles (HEVs) and Electric Vehicles (EVs). Typical lithium ion batteries comprise a first electrode (e.g., a cathode), a second electrode (e.g., an anode), an electrolyte material, and a separator. Often lithium ion battery cells are electrically connected in a stack to increase overall output. Conventional lithium ion batteries operate by reversibly passing lithium ions between the negative electrode and the positive electrode. The separator and electrolyte are disposed between the negative and positive electrodes. The electrolyte is suitable for conducting lithium ions and may be in solid or liquid form. Lithium ions move from a cathode (i.e., positive electrode) to an anode (i.e., negative electrode) during charging of the battery, and in the opposite direction when discharging the battery.

The potential difference or voltage of a battery cell is determined by differences in chemical potentials (e.g., Fermi energy levels) between the electrodes. Under normal operating conditions, the potential difference between the electrodes achieves a maximum achievable value when the battery cell is fully charged and a minimum achievable value when the battery cell is fully discharged. The battery cell will discharge and the minimum achievable value will be obtained when the electrodes are connected to a load performing the desired function (e.g., electric motor, light bulb) via an external circuit. Each of the negative and positive electrodes in the battery cell is connected to a current collector (typically a metal, such as copper for the anode and aluminum for the cathode). The current collectors associated with the two electrodes are connected by an external circuit that allows current generated by electrons to pass between the electrodes to compensate for transport of lithium ions across the battery cell. For example, during cell discharge, the internal Li+ ionic current from the negative electrode to the positive electrode may be compensated by the electronic current flowing through the external circuit from the negative electrode to the positive electrode of the battery cell.

Many different materials may be used to create components for a lithium ion battery. For example, positive electrode materials for lithium batteries typically comprise an electroactive material which can be intercalated with lithium ions, such as lithium-transition metal oxides or mixed oxides, for example including $LiMn_2O_4$, $LiCoO_2$, $LiNiO_2$, $LiMn_{1.5}Ni_{0.5}O_4$, $LiNi_{(1-x-y)}Co_xM_yO_2$ (where 0<x<1, y<1, and M may be Al, Mn, or the like), or one or more phosphate compounds, for example including lithium iron phosphate or mixed lithium manganese-iron phosphate. The electrolyte typically contains one or more lithium salts, which may be dissolved and ionized in an aprotic non-aqueous solvent. The negative electrode typically includes a lithium insertion material or an alloy host material. For example, typical electroactive materials for forming an anode include graphite and other forms of carbon, silicon and silicon oxide, tin and tin alloys.

The separator can be made using wet or dry processes to form an insulating barrier having adequate porosity to enable ions to move between the first and second electrodes. Separators are commonly mixed with, or coated by, a ceramic material to further improve mechanical strength and/or high temperature performance. However, current ceramic-coated separators may increase internal resistance, reducing capacity retention. Accordingly, it would be desirable to provide durable, long-lifetime lithium-ion batteries having improved separators that help avoid or minimize capacity fade and loss within the cell, while having improved high rate capability, high Coulombic efficiency, and high thermal stability.

SUMMARY

This section provides a general summary of the disclosure, and is not a comprehensive disclosure of its full scope or all of its features.

In various aspects, the present disclosure provides a method of manufacturing a ceramic-coated separator for a lithium-containing electrochemical cell. The method may include admixing a powder with a binder so as to form a slurry having a viscosity ranging from greater than or equal to about 300 cps to less than or equal to about 1400 cps at a temperature of about 25° C. The powder may include one or more lithiated oxides selected from the group consisting of $Li_2SiO_3$, $LiAlO_2$, $Li_2TiO_3$, $LiNbO_3$, $Li_3PO_4$, $Li_2CrO_4$, $Li_2Cr_2O_7$, and combinations thereof. The slurry may be disposed onto one or more surfaces of a porous substrate to form an inorganic surface layer; and liquid may be removed from the inorganic surface layer to form a ceramic coating on the one or more surfaces of the porous substrate so as to create the ceramic-coated separator. Liquid may be removed from the inorganic surface layer by exposing the inorganic surface layer to a temperature greater than or equal to about 50° C. to less than or equal to about 100° C. for a time greater than or equal to about 6 hours to less than or equal to about 24 hours. The lithium-containing electrochemical cell including the ceramic-coated separator may cycle at temperatures greater than or equal to about 50° C. and may have a charge capacity loss of less than or equal to about 25% after 25 cycles of lithiation and delithiation In one aspect, the slurry is a first slurry and the method may further include admixing a precursor zeolite powder with an aqueous solution comprising lithium hydroxide (LiOH) to form a second slurry. Lithium-ion exchange between the precursor zeolite powder and formation of the lithiated-oxide powder may be promoted by subjecting the second slurry to a temperature greater than or equal to about 30° C. to less than or equal to about 100° C. for a time greater than or equal to about 6 hours to less than or equal to about 24 hours.

In one aspect, the precursor zeolite powder may include one or more zeolite materials selected from the group consisting of zeolite A, zeolite X, zeolite Y, zeolite L, ZSM-5, zeolite beta, mordenite, ferrierite, and combinations thereof. The precursor zeolite powder may have a cumulative total concentration of sodium and hydrogen that is less than a lithium hydroxide concentration of the aqueous solution.

In one aspect, the precursor zeolite powder may further include greater than about 1 wt. % to less than or equal to about 20 wt. % of sodium oxide ($NaO_2$).

In one aspect, the method may further include, prior to the admixing of the powder with the aqueous binder, calcining the powder at a temperature greater than or equal to about 200° C. to less than or equal to about 400° C. for a time greater than or equal to about 2 hours to less than or equal to about 6 hours.

In one aspect, the lithiated-oxide powder may include a plurality of particles and the method may further include comminuting the slurry with a grinding media so that the particles have an average diameter of less than or equal to about 1 µm.

In one aspect, the grinding media may include one or more materials selected from the group consisting of: zirconia, alumina, stainless steel, and combinations thereof.

In one aspect, the slurry may be disposed on the one or more surfaces of the porous substrate using a process selected from the group consisting of: spraying, brushing, dip coating, doctor-blade coating, spin coating, casting, printing, and combinations thereof.

In one aspect, the slurry may be disposed on the one or more surfaces of the porous substrate using a doctor-blade coating method having a blade gap of less than 30 µm.

In one aspect, a weight ratio of the binder to the powder may be greater than or equal to about 5% to less than or equal to about 30%, and the binder may be selected from the group consisting of: carboxymethyl cellulose (CMC), sodium alginate, polyacrylic acid (PAA), styrene-butadiene rubber (SBR), polyvinylidene fluoride (PVdF), and combinations thereof.

In one aspect, the ceramic coating may have a thickness of less than about 10 µm.

In various other aspects, the present disclosure provides a method of manufacturing a ceramic-coated substrate for a lithium-containing electrochemical cell. The method may include admixing a precursor zeolite powder with an aqueous solution to form a zeolite slurry. The aqueous solution may include comprising lithium hydroxide (LiOH). The method may further include exposing the zeolite slurry to a temperature greater than or equal to about 50° C. to less than or equal to about 100° C. for a time greater than or equal to about 6 hours to less than or equal to about 24 hours to form a lithiated-oxide powder. The lithiated-oxide powder may include one or more lithiated oxides selected from the group consisting of $Li_2SiO_3$, $LiAlO_2$, $Li_2TiO_3$, $LiNbO_3$, $Li_3PO_4$, $Li_2CrO_4$, $Li_2Cr_2O_7$, and combinations thereof. The lithiated-oxide powder may be admixed with a binder selected from the group consisting of: carboxymethyl cellulose (CMC), sodium alginate, polyacrylic acid (PAA), styrene-butadiene rubber (SBR), polyvinylidene fluoride (PVdF), and combinations thereof to form a lithiated-oxide slurry. The lithiated-oxide slurry may be disposed onto one or more surfaces of a substrate and exposed to a temperature greater than or equal to about 50° C. to less than or equal to about 120° C. for a time greater than or equal to about 6 hours to less than or equal to about 24 hours to form a ceramic coating on the one or more surfaces of the substrate so as to create the ceramic-coated substrate. The lithium-containing electrochemical cell including the ceramic-coated separator may cycle at temperatures greater than or equal to about 50° C. and may have a charge capacity loss of less than or equal to about 25% after 25 cycles of lithiation and delithiation.

In one aspect, preparing the lithiated-oxide powder may further include contacting the lithiated-oxide powder with an aqueous liquid and calcining the lithiated-oxide powder at a temperature greater than or equal to about 50° C. to less than or equal to about 100° C. for a time greater than or equal to about 2 hours to less than or equal to about 6 hours.

In one aspect, the precursor zeolite powder may include one or more zeolite materials selected from the group consisting of zeolite A, zeolite X, zeolite Y, zeolite L, ZSM-5, zeolite beta, mordenite, ferrierite, and combinations thereof. The precursor zeolite powder may have a cumulative total concentration of sodium and hydrogen that is less than a lithium hydroxide concentration of the aqueous solution.

In one aspect, the lithiated-oxide powder may include a plurality of particles and the method may further include comminuting the slurry with a grinding media so that the particles have an average diameter of less than or equal to about 1 µm.

In one aspect, the lithiated-oxide slurry may have a viscosity ranging from greater than or equal to about 300 cps to less than or equal to about 1400 cps at a temperature of about 25° C.

In one aspect, the lithiated-oxide slurry may be disposed on the one or more surfaces of the porous substrate using a doctor-blade coating method having a blade gap of less than 30 µm.

In one aspect, weight ratio of the binder to the lithiated-oxide powder may be greater than or equal to about 5% to less than or equal to about 30%.

In still various other aspects, the present disclosure provides a ceramic-coated separator for a lithium-containing electrochemical cell. The ceramic-coated separator may include a porous substrate and a ceramic coating disposed on one or more surfaces of the porous substrate. The ceramic coating may include one or more lithiated oxides selected from the group consisting of $Li_2SiO_3$, $LiAlO_2$, $Li_2TiO_3$, $LiNbO_3$, $Li_3PO_4$, $Li_2CrO_4$, $Li_2Cr_2O_7$, and combinations thereof. The ceramic coating may have a thickness of greater than or equal to about 5 µm to less than about 10 µm. The lithium-containing electrochemical cell including the ceramic-coated separator may cycle at temperatures greater than or equal to about 50° C. and may have a charge capacity loss of less than or equal to about 25% after 25 cycles of lithiation and delithiation Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
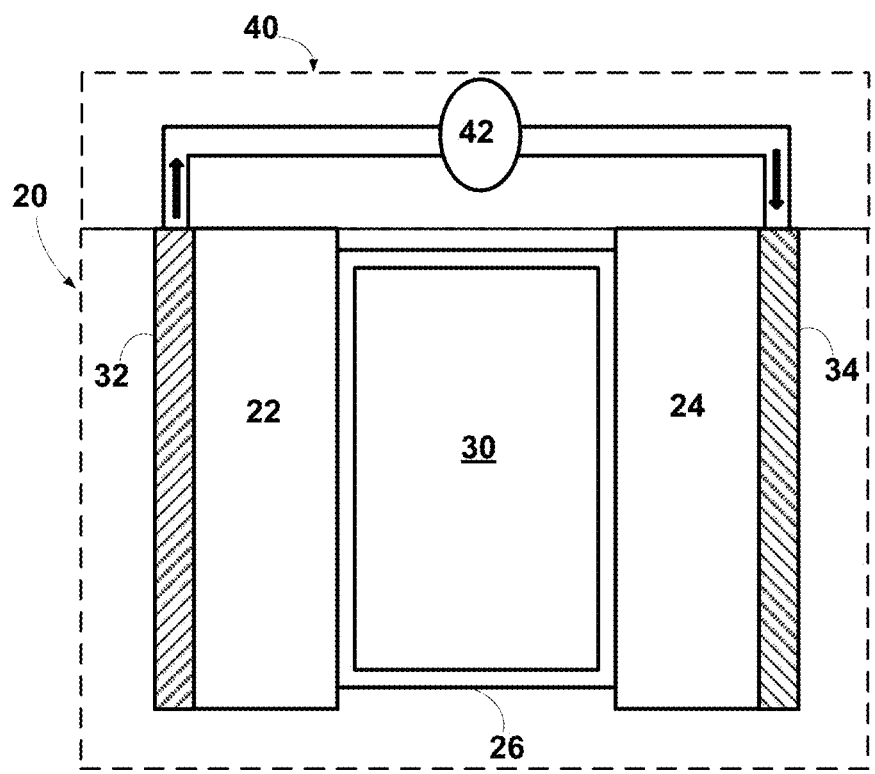
FIG. 1 is a schematic illustration of an electrochemical cell according to various aspects of the present disclosure.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

The present technology pertains to lithium-ion electrochemical cells that may be incorporated into energy storage devices like rechargeable lithium-ion batteries, which may be used in vehicle applications. However, the present technology may also be used in other electrochemical devices that cycle lithium ions, such as handheld electronic devices. In various aspects, the present disclosure provides a rechargeable lithium-ion battery that exhibits improved high temperature performance.

An exemplary schematic illustration of a lithium-ion battery 20 is shown in FIG. 1. The lithium-ion battery 20 includes a negative electrode 22, a positive electrode 24, and a separator 26 (e.g., a microporous or nanoporous polymeric separator) disposed between the negative and positive electrodes 22, 24. The space between (e.g., the separator 26) the negative electrode 22 and the positive electrode 24 can be filled with an electrolyte 30. If there are pores (not shown) inside the negative electrode 22 and/or the positive electrode 24, the pores may also be filled with the electrolyte.

A negative electrode current collector 32 may be positioned at or near the negative electrode 22, and a positive electrode current collector 34 may be positioned at or near the positive electrode 24. The negative electrode current collector 32 and positive electrode current collector 34 respectively collect and move free electrons to and from an external circuit 40. An interruptible external circuit 40 having a load device 42 connects the negative electrode 22 (through the negative electrode current collector 32) and the positive electrode 24 (through the positive electrode current collector 34). Each of the negative electrode 22, the positive electrode 24, and the separator 26 may further comprise the electrolyte 30, which is capable of conducting lithium ions. The separator 26 operates as both an electrical insulator and a mechanical support, by being sandwiched between the negative electrode 22 and the positive electrode 24 to prevent physical contact and, thus, the occurrence of a short circuit. The separator 26, in addition to providing a physical barrier between the two electrodes 22, 24, can provide a minimal resistance path for internal passage of lithium ions (and related anions) for facilitating functioning of the lithium ion battery 20.

The lithium-ion battery 20 can generate an electric current during discharge by way of reversible electrochemical reactions that occur when the external circuit 40 is closed (to connect the negative electrode 22 and the positive electrode 24) when the negative electrode 22 contains a relatively greater quantity of inserted lithium. The chemical potential difference between the positive electrode 24 and the negative electrode 22 drives electrons produced by the oxidation of inserted lithium at the negative electrode 22 through the external circuit 40 toward the positive electrode 24. Lithium ions, which are also produced at the negative electrode, are concurrently transferred through the electrolyte 30 and separator 26 towards the positive electrode 24. The electrons flow through the external circuit 40 and the lithium ions migrate across the separator 26 in the electrolyte 30 to form intercalated or alloyed lithium at the positive electrode 24. The electric current passing through the external circuit 40 can be harnessed and directed through the load device 42 until the intercalated lithium in the negative electrode 22 is depleted and the capacity of the lithium-ion battery 20 is diminished.

The lithium-ion battery 20 can be charged or re-energized at any time by connecting an external power source (e.g., charging device) to the lithium-ion battery 20 to reverse the electrochemical reactions that occur during battery discharge. The connection of an external power source to the lithium-ion battery 20 compels the otherwise non-spontaneous oxidation of intercalated lithium at the positive electrode 24 to produce electrons and lithium ions. The electrons, which flow back towards the negative electrode 22 through the external circuit 40, and the lithium ions, which are carried by the electrolyte 30 across the separator 26 back towards the negative electrode 22, reunite at the negative electrode 22 and replenish it with lithium for consumption during the next battery discharge cycle. As such, each discharge and charge event is considered to be a cycle, where lithium ions are cycled between the positive electrode 24 and negative electrode 22.

The external power source that may be used to charge the lithium-ion battery 20 may vary depending on the size, construction, and particular end-use of the lithium-ion battery 20. Some notable and exemplary external power sources include, but are not limited to, AC power sources, such as an AC wall outlet and a motor vehicle alternator. In many lithium-ion battery configurations, each of the negative current collector 32, the negative electrode 22, the separator 26, the positive electrode 24, and the positive current collector 34 are prepared as relatively thin layers (for example, from several microns to a millimeter or less in thickness) and assembled in layers connected in electrical parallel arrangement to provide a suitable energy package.

Furthermore, the lithium-ion battery 20 can include a variety of other components that while not depicted here are nonetheless known to those of skill in the art. For instance, the lithium-ion battery 20 may include a casing, gaskets, terminal caps, and any other conventional components or materials that may be situated within the battery 20, including between or around the negative electrode 22, the positive electrode 24, and/or the separator 26, by way of non-limiting example. As noted above, the size and shape of the lithium-ion battery 20 may vary depending on the particular application for which it is designed. Battery-powered vehicles and hand-held consumer electronic devices, for example, are two examples where the lithium-ion battery 20 would most likely be designed to different size, capacity, and power-output specifications. The lithium-ion battery 20 may also be connected in series or parallel with other similar lithium-ion cells or batteries to produce a greater voltage output, energy, and power if it is required by the load device 42.

Accordingly, the lithium-ion battery 20 can generate electric current to a load device 42 that can be operatively connected to the external circuit 40. The load device 42 may be powered fully or partially by the electric current passing through the external circuit 40 when the lithium ion battery 20 is discharging. While the load device 42 may be any number of known electrically-powered devices, a few specific examples of power-consuming load devices include an electric motor for a hybrid vehicle or an all-electric vehicle, a laptop computer, a tablet computer, a cellular phone, and cordless power tools or appliances, by way of non-limiting example. The load device 42 may also be a power-generating apparatus that charges the lithium-ion battery 20 for purposes of storing energy.

Any appropriate electrolyte 30 capable of conducting lithium ions between the negative electrode 22 and the positive electrode 24 may be used in the lithium ion battery 20. In certain aspects, the electrolyte solution may be a non-aqueous liquid electrolyte solution that includes a lithium salt dissolved in an organic solvent or a mixture of organic solvents. Numerous conventional non-aqueous liquid electrolyte 30 solutions may be employed in the lithium ion battery 20.

A non-limiting list of lithium salts that may be dissolved in an organic solvent to form the nonaqueous liquid electrolyte solution include lithium hexafluorophosphate ($LiPF_6$), lithium perchlorate ($LiClO_4$), lithium tetrachloroaluminate ($LiAlCl_4$), lithium iodide (LiI), lithium bromide (LiBr), lithium thiocyanate (LiSCN), lithium tetrafluoroborate ($LiBF_4$), lithium tetraphenylborate ($LiB(C_6H_5)_4$), lithium bis(oxalato)borate ($LiB(C_2O_4)_2$) (LiBOB), lithium difluorooxalatoborate ($LiBF_2(C_2O_4)$), lithium hexafluoroarsenate ($LiAsF_6$), lithium trifluoromethanesulfonate (LiCF$_3$SO$_3$), lithium bis(trifluoromethane)sulfonylimide (LiN(CF$_3$SO$_2$)$_2$), lithium bis(fluorosulfonyl)imide (LiN(FSO$_2$)$_2$) (LiFSI), and combinations thereof.

These and other similar lithium salts may be dissolved in a variety of organic solvents, including but not limited to various alkyl carbonates, such as cyclic carbonates (e.g., ethylene carbonate (EC), propylene carbonate (PC), butylene carbonate (BC), fluoroethylene carbonate (FEC)), linear carbonates (e.g., dimethyl carbonate (DMC), diethyl carbonate (DEC), ethyl methyl carbonate (EMC)), aliphatic carboxylic esters (e.g., methyl formate, methyl acetate, methyl propionate), γ-lactones (e.g., γ-butyrolactone, γ-valerolactone), chain structure ethers (e.g., 1,2-dimethoxyethane, 1-2-diethoxyethane, ethoxymethoxyethane), cyclic ethers (e.g., tetrahydrofuran, 2-methyltetrahydrofuran), 1,3-dioxolane), sulfur compounds (e.g., sulfolane), and combinations thereof.

The positive electrode 24 may be formed from a lithium-based active material that can undergo lithium intercalation and deintercalation while functioning as the positive terminal of the battery 20. The positive electrode 24 electroactive materials may also include a polymeric binder material to structurally fortify the lithium-based active material and an electrically conductive material.

One exemplary common class of known materials that can be used to form the positive electrode 24 is layered lithium transitional metal oxides. For example, in certain embodiments, the positive electrode 24 may comprise at least one spinel comprising a transition metal like lithium manganese oxide (Li$_{(1+x)}$Mn$_{(2-x)}$O$_4$), where 0≤x≤1, where x is typically less than 0.15, including lithium manganese nickel oxide (LiMn$_{(2-x)}$Ni$_x$O$_4$) (where 0≤x≤1 (e.g., LiMn$_{1.5}$Ni$_{0.5}$O$_4$)), lithium cobalt oxide (LiCoO$_2$), lithium manganese oxide (LiMn$_2$O$_4$), lithium nickel oxide (LiNiO$_2$), a lithium nickel manganese cobalt oxide (Li(Ni$_x$Mn$_y$Co$_z$)O$_2$) (where 0<x<1, 0<y<1, 0<z<1 and x+y+z=1, including LiMn$_{0.33}$Ni$_{0.33}$Co$_{0.33}$O$_2$, a lithium nickel cobalt metal oxide (LiNi$_{(1-x-y)}$Co$_x$M$_y$O$_2$), where 0<x<1, y<1, and M may be Al, Mn, or the like), other known lithium-transition metal oxides or mixed oxides lithium iron phosphates, or a lithium iron polyanion oxide such as lithium iron phosphate (LiFePO$_4$) or lithium iron fluorophosphate (Li$_2$FePO$_4$F).

Such positive active materials may be optionally intermingled with an electronically conducting material that provides an electron conduction path and/or at least one polymeric binder material that improves the structural integrity of the positive electrode 24. For example, the positive active materials and electronically conducting materials may be slurry cast with such binders, like polyvinylidene difluoride (PVdF), polytetrafluoroethylene (PTFE), ethylene propylene diene monomer (EPDM) rubber, or carboxymethyl cellulose (CMC), a nitrile butadiene rubber (NBR), styrene-butadiene rubber (SBR), lithium polyacrylate (LiPAA), sodium polyacrylate (NaPAA), sodium alginate, lithium alginate. Electronically conducting materials may include carbon-based materials, powdered nickel or other metal particles, or a conductive polymer. Carbon-based materials may include, for example, particles of graphite, acetylene black (such as KETCHEN™ black or DENKA™ black), carbon fibers and nanotubes, graphene, and the like. Examples of a conductive polymer include polyaniline, polythiophene, polyacetylene, polypyrrole, and the like. In certain aspects, mixtures of the conductive materials may be used. The positive current collector 34 may be formed from aluminum or any other appropriate electrically conductive material known to those of skill in the art.

The negative electrode 22 may be formed from a lithium host material that is capable of functioning as a negative terminal of a lithium ion battery. The negative electrode 22 may thus include the electroactive material and optionally another electrically conductive material, as well as one or more polymeric binder materials to structurally hold the lithium host material together. In certain variations, the negative electroactive material may comprise lithium, for example lithium metal. In certain variations, the negative electrode 22 is a film or layer formed of lithium metal or an alloy of lithium. In certain variations, the negative electroactive material comprises carbon-based materials, such as graphite, or silicon and/or silicon-based alloys.

Such negative active materials may be optionally intermingled with an electronically conducting material that provides an electron conduction path and/or at least one polymeric binder material that improves the structural integrity of the negative electrode 22. By way of non-limiting example, the negative electrode 22 may include an active material including lithium metal particles (e.g., lithium foil) intermingled with a binder material selected from the group consisting of: polyvinylidene difluoride (PVdF), polytetrafluoroethylene (PTFE), ethylene propylene diene monomer (EPDM) rubber, or carboxymethoxyl cellulose (CMC), a nitrile butadiene rubber (NBR), lithium polyacrylate (Li-PAA), sodium polyacrylate (NaPAA), sodium alginate, lithium alginate, and combinations thereof. Suitable additional electrically conductive materials may include carbon-based material or a conductive polymer. Carbon-based materials may include by way of non-limiting example, particles of KETCHEN™ black, DENKA™ black, acetylene black, carbon black, and the like. Examples of a conductive polymer include polyaniline, polythiophene, polyacetylene, polypyrrole, and the like. In certain aspects, mixtures of conductive materials may be used. The negative electrode current collector 32 may be formed from copper (Cu) or any other appropriate electrically conductive material known to those of skill in the art.

The separator 26 may comprise any organic or inorganic material that can physically separate and electrically insulate a positive and negative electrode from each other while permitting the free flow of lithium ions therebetween. For example, in certain variations, the separator 26 may comprise a microporous polymeric separator comprising a polyolefin. The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), or a blend of PE and PP, or multi-layered structured porous films of PE and/or PP. Commercially available polyolefin porous separator 26 membranes include CELGARD® 2500 (a monolayer polypropylene separator) and CELGARD® 2340 (a trilayer polypropylene/polyethylene/polypropylene separator) available from Celgard LLC.

When the separator 26 is a microporous polymeric separator, it may be a single layer or a multi-layer laminate, which may be fabricated from either a dry or wet process. For example, in one embodiment, a single layer of the polyolefin may form the entire microporous polymer separator 26. In other aspects, the separator 26 may be a fibrous membrane having an abundance of pores extending between the opposing surfaces and may have a thickness of less than a millimeter, for example. As another example, however, multiple discrete layers of similar or dissimilar polyolefins may be assembled to form the microporous polymer separator 26.

The microporous polymer separator 26 may also comprise other polymers in addition to the polyolefin such as, but not limited to, polyethylene terephthalate (PET), polyvinylidene fluoride (PVdF), and/or a polyamide. The polyolefin layer, and any other optional polymer layers, may further be included in the microporous polymer separator 26 as a fibrous layer to help provide the microporous polymer separator 26 with appropriate structural and porosity characteristics. Various conventionally available polymers and commercial products for forming the separator 26 are contemplated, as well as the many manufacturing methods that may be employed to produce such a microporous polymer separator 26.

In various instances, the separator 26 may be mixed with a ceramic material and/or one or more surfaces of the separator 26 may be coated with a ceramic material in accordance with certain aspects of the present disclosure. For example, a ceramic coating may be disposed on one or more surfaces of the substrate 26. In certain variations, the ceramic coating may comprise one or more lithiated oxides selected from the group consisting of $Li_2SiO_3$, $LiAlO_2$, $Li_2TiO_3$, $LiNbO_3$, $Li_3PO_4$, $Li_2CrO_4$, $Li_2Cr_2O_7$, and combinations thereof. The one or more lithiated oxides have an ionic conductivity greater than or equal to about $1\times10^{-8}$ S/m to less than or equal to about $1\times10^{-2}$ S/m. Further, in various instances, the lithiated oxides may have an average particles diameter of greater than or equal to about 50 nm to less than or equal to about 3 μm, and in certain aspects, optionally about 1 μm. The lithiated oxides may have an average BET surface area of greater than or equal to about 10 $m^2$/g to less than or equal to about 1000 $m^2$/g, and in certain aspects, optionally about 78 $m^2$/g.

Figure 2:
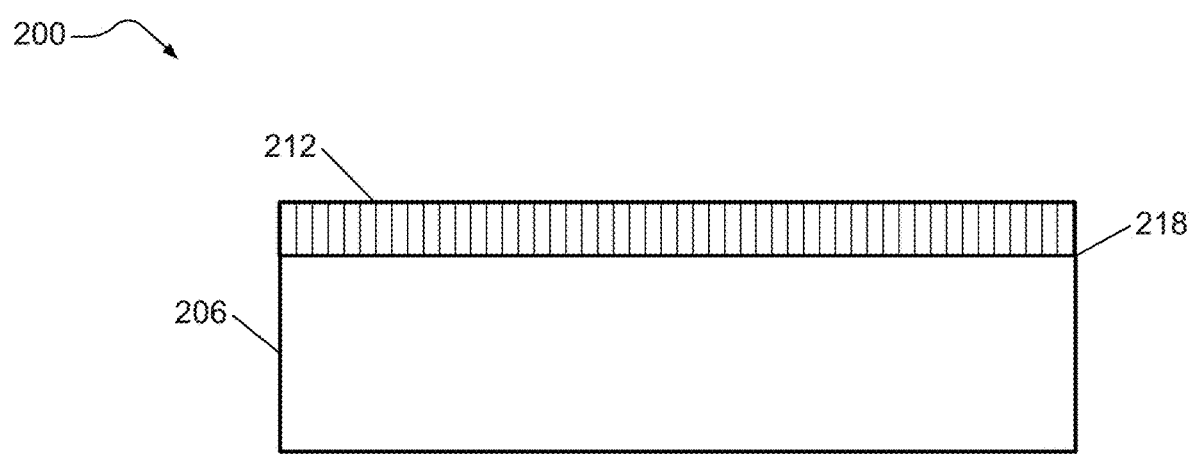
FIG. 2 is a schematic illustration of a ceramic-coated separator according to various aspects of the present disclosure.

FIG. 2 illustrates a ceramic-coating separator 200 for a lithium-containing electrochemical cell, such as battery 20. The ceramic-coating separator 200 comprises a porous substrate 206 and, in certain variations, a ceramic coating 212 may be disposed on one or more surfaces of the porous substrate 206. The one or more surfaces of the porous substrate 206 comprise external surfaces, including any exposed pores, and in certain variations, internal pore surfaces extending into the body of the porous substrate 206. The one or more surfaces of the porous substrate 206 may be treated in accordance with certain aspects of the present disclosure to have a ceramic coating or layer 212 disposed thereon. For example, as illustrated, a ceramic coating 212 may be disposed on a first surface 218 of the porous substrate 206. In various aspects, the ceramic coating 212 may have a thickness of greater than or equal to about 1 μm to less than about 50 μm, and in certain aspects, optionally greater than or equal to about 5 μm to less than or equal to about 50 μm. In certain variations, the ceramic-coated surface 218 of the substrate 206 may oppose a first surface of an anode (not shown). However, as the skilled artisan will appreciate, in various other instances, the ceramic-coated surface may oppose a first surface of a cathode (not shown) and/or opposing sides of the substrate may be each coated (not shown) such that a first ceramic-coated surface opposes the cathode and a second ceramic-coated surface opposes the anode. The ceramic coating 212 may include ionically conductive materials. For example, the ceramic coating 212 may include one or more lithiated oxides. The one or more lithiated oxides may be selected from the group consisting of $Li_2SiO_3$, $LiAlO_2$, $Li_2TiO_3$, $LiNbO_3$, $Li_3PO_4$, $Li_2CrO_4$, $Li_2Cr_2O_7$, and combinations thereof.

A lithium-containing electrochemical cell incorporating such a ceramic-coated separator prepared in accordance with certain aspects of the present disclosure minimizes Coulombic charge capacity loss (capacity fade) and enhances cycle life, including when the electrochemical cell cycles lithium at temperatures greater than or equal to about 50° C. In certain variations, the lithium ion electrochemical cell comprising a ceramic-coated separator prepared in accordance with certain aspects of the present disclosure may exhibit less than or equal to about 40% charge capacity decay (after the initial cycle stabilizes) after 25 cycles of lithiation and delithiation, optionally less than or equal to about 35% capacity loss, optionally less than or equal to about 30% capacity loss, optionally less than or equal to about 25% capacity loss, optionally less than or equal to about 20% capacity loss, and in certain aspects, optionally less than or equal to about 16% capacity loss after 25 cycles of lithiation and delithiation. In certain variations, the lithium ion electrochemical cell may minimize capacity decay at these levels at greater than or equal to about 30 cycles of lithiation and delithiation, optionally greater than or equal to about 35 cycles of lithiation and delithiation, optionally greater than or equal to about 40 cycles of lithiation and delithiation, optionally greater than or equal to about 45 cycles of lithiation and delithiation, and in certain variations, greater than or equal to about 50 cycles of lithiation and delithiation.

For example, a lithium-containing electrochemical cell comprising a ceramic-coated separator according to various aspects of the present disclosure may retain greater than or equal to about 60% of charge capacity, for example, having greater than or equal to about 60% capacity retention, optionally greater than or equal to about 65% capacity retention, optionally greater than or equal to about 70% capacity retention, optionally greater than or equal to about 75% capacity retention, optionally greater than or equal to about 80% capacity retention, and in certain aspects, optionally greater than or equal to about 84% capacity retention after 25 cycles or more of lithium ion insertion and deinsertion (intercalation/alloying and deintercalation/dealloying-intercalation/alloying) in the lithium-containing electrochemical cell, including in certain variations, at temperatures of greater than or equal to about 50° C.

In various aspects, the present disclosure provides a method for manufacturing a ceramic-coated separator, such as the ceramic-coated separator 200 depicted in FIG. 2. The method includes admixing a powder comprising one or more ionically conductive materials with a binder, and in certain variations, optionally an aqueous binder, to form a liquid or semi-liquid mixture. A semi-liquid may encompass a colloid or gel, for example, during a sol-gel process. In certain variations, the liquid or semi-liquid mixture may be a first, lithiated-oxide slurry having a viscosity greater than or equal to about 300 cps to less than or equal to about 1400 cps at a temperature of about 25° C.

The binder may be selected from the group consisting of: carboxymethyl cellulose (CMC), sodium alginate, polyacrylic acid (PAA), styrene-butadiene rubber (SBR), polyvinylidene fluoride (PVdF), and combinations thereof; and the ionically conductive materials may comprise one or more lithiated oxides. For example, the binder may be admixed with a powder comprising one or more lithiated oxides selected from the group consisting of $Li_2SiO_3$, $LiAlO_2$, $Li_2TiO_3$, $LiNbO_3$, $Li_3PO_4$, $Li_2CrO_4$, $Li_2Cr_2O_7$, and combinations thereof. A weight ratio of the binder to the powder may be greater than or equal to about 5 wt. % to less than or equal to about 30 wt. %.

In further variations, a grinding media having, for example, a round shape, for example, a ball-shape may also be admixed with the powder and the binder. In various instances, the grinding media may include one or more materials selected from zirconia, stainless steel, and alumina. For example, in certain variations, greater than or equal to about 30 wt. % to less than or equal to about 60 wt. % of zirconia balls may be admixed with the powder and the binder. The grinding media may mill or comminute the powder to reduce an average particle size within the slurry. For example, in various instances, the powder comprises a plurality of particles and the grinding media reduces an average particle diameter of the powder particles in the mixture. For example, the average particle diameter of the powder particles may be reduced by about 30%. After comminuting, the powder particles may have an average particle diameter greater than or equal to about 300 nm to less than or equal to about 2 µm, and in certain aspects, optionally less than or equal to about 1 µm. In certain variations, the grinding media may also aid in homogeneously distributing the powder within the first, lithiated-oxide slurry.

After the admixing of the powder comprising the one or more ionically conductive materials with the binder and/or grinding media, the lithiated-oxide slurry may be disposed, for example, casted, onto one or more surfaces of a porous substrate to form an inorganic surface layer. The one or more surfaces of the porous substrate comprise external surfaces, including any exposed pores, and in certain variations, internal pore surfaces extending into the body of the porous substrate. The first slurry, the inorganic surface layer may coat greater than or equal to about 50%, and in certain aspects, optionally greater than or equal to about 90%, of the total surface area of the porous substrate. In various aspects, the first slurry may be disposed onto the one or more surfaces or sides of the porous substrate using a process selected from the group consisting of spraying, brushing, dip coating, doctor-blade coating, spin coating, casting, printing, and combinations thereof. For example, in certain variations, the first slurry may be disposed on the one or more surfaces of the porous substrate using a doctor-blade coating method having a blade gap of less than 30 µm, such that the inorganic surface layer has a thickness of about 30 µm.

The inorganic surface layer is dried, for example, liquid is removed from the liquid or semi-liquid mixture, to form the ceramic coating. For example, in various aspects, the inorganic surface layer may be exposed to a temperature greater than or equal to about 50° C. to less than or equal to about 120° C., optionally greater than or equal to about 50° C. to less than or equal to about 100° C. and in certain aspects, optionally about 60° C., for a time greater than or equal to about 6 hours to less than or equal to about 24 hours. In certain variations, the ceramic coating may coat greater than or equal to about 50% of a total surface area of the porous substrate, and in certain aspects, optionally greater than or equal to about 90%. The formed ceramic coating may have a thickness of greater than or equal to about 1 µm to less than about 50 µm, and in certain aspects, optionally greater than or equal to about 5 µm to less than or equal to about 50 µm.

In various aspects, the present disclosure provides a method for preparing the lithiated-oxide powder that is admixed with the binder (for example, aqueous binder) to form the first, lithiated-oxide slurry as detailed above. The method for preparing the lithiated-oxide powder includes admixing a precursor zeolite-based powder with a solution, for example, an aqueous solution, comprising one or more of lithium hydroxide (LiOH) and lithium chloride (LiCl) to form a second, zeolite slurry. A weight ratio of the precursor zeolite to the solution may be greater than or equal to about 1 wt. % to less than or equal to about 10 wt. %; and a weight ratio of the lithium hydroxide to the solution may be greater than or equal to about 0.5 wt. % to less than or equal to about 5 wt. %.

Zeolites are microporous, crystalline aluminosilicate materials comprising three-dimensional frameworks including, for example, tetrahedral units comprising alumina ($AlO_2$) and/or silica ($SiO_2$), and extra-framework, exchangeable cations, such as $Li^+$, $Na^+$, $K^+$, $Ca^+$, and/or $Mg^{2+}$. For example, each alumina ($AlO_2$) unit introduces one negative charge to the framework that is counteracted by the extra-framework cations. Zeolites are commonly categorized based upon the crystalline structure of the corner-sharing network of tetrahedrally coordinated atoms or T-atoms (e.g., silicon and/or aluminum). In various aspects, the precursor zeolite powder of the present disclosure may include one or more zeolite materials having a Si:Al ratio that is greater than or equal to about 1:1 to less than or equal to about 2:1. For example, the precursor zeolite powder may include one or more zeolite materials having zeolite framework types selected from ABW, AFG, ANA, BIK, CAN, EDI, FAU, FRA, GIS, GME, JBW, LAU, LEV, LIO, LOS, LTA, LTN, NAT, PAR, PHI, ROG, SOD, WEN, THO, and TSC. In various other aspects, the precursor zeolite powder may include one or more zeolite materials having a Si:Al ratio that is greater than or equal to about 2:1 to less than or equal to about 5:1. For example, the precursor zeolite powder may include one or more zeolite material having zeolite framework types selected from BHP, BOG, BRE, CAS, CHA, CHI, DAC, EAB, EMT, EPI, ERI, FAU, FER, GOO, HEU, KFI, LOV, LTA, LTL, MAZ, MEI, MER, MON, MOR, OFF, PAU, RHO, SOD, STI, and YUG. In still various other aspects, the precursor zeolite powder may include one or more zeolite materials having a Si:Al ratio that is greater than 5:1. For example, the precursor zeolite powder may include one or more zeolite materials having zeolite framework types selected from ASV, BEA, CFI, CON, DDR, DOH, DON, ESV, EUO, FER, GON, IFR, ISV, ITE, LEV, MEL, MEP, MFI, MFS, MSO, MTF, MTN, MTT, MTW, MWW, NON, NES, RSN, RTE, RTH, RUT, SFE, SFF, SGT, SOD, STF, STT, TER, TON, VET, VNI, and VSV.

In this manner, in certain variations, the precursor zeolite powder may include one or more zeolite materials selected from the group consisting of zeolite A, zeolite X, zeolite Y, zeolite L, ZSM-5, zeolite beta, mordenite, ferrierite, and combinations thereof. For example, the precursor zeolite may comprise a zeolite material such as zeolite Y. Zeolite Y has a ratio of silicon to aluminum of greater than or equal to about 1.5 to less than or equal to about 3 and a surface area of about 453 $m^2/g$. In various aspects, the zeolite material may have an average particle size that is less than or equal to about 5 µm, and in certain variations, optionally less than or equal to about 1 µm.

In certain variations, the precursor zeolite powder further comprises greater than or equal to about 1 wt. % to less than or equal to about 20 wt. % of sodium oxide ($NaO_2$). When the mixture is exposed to a temperature greater than or equal to about 30° C. to less than or equal to about 100° C., and in certain aspects, optionally about 60° C., for a time greater than or equal to about 6 hours to less than or equal to about 24 hours, and in certain aspects, optionally about 12 hours, the sodium oxide facilitates lithium-ion exchange between the lithium hydroxide and/or lithium chloride within the solution and the extra-framework cations and/or free ions within the zeolite material. In various instances, it is desirable that the zeolite material has a cumulative total concentration of sodium and hydrogen that is less than the lithium hydroxide concentration and/or lithium chloride concentration in the solution, so as to drive the ion exchange between the lithium ions and the sodium ions or protons. Such lithium-ion exchange results in the formation of one or more lithiated oxides, for example, a powder comprising one or more lithiated oxides. In certain variations, the lithiate oxides such as $Li_2SiO_3$ and $LiAlO_2$ result from such lithium-ion exchange between the zeolite material and the lithium hydroxide and/or lithium chloride.

In various aspects, the formed lithiated-oxide powder may be washed, for example, to remove residual lithium hydroxide and/or lithium chloride. Residual lithium hydroxide and/or lithium chloride may undesirably increase the moisture levels by reacting with carbon dioxide within the cell. The lithiated oxides may be washed using an aqueous liquid, for example, water. In certain variations the water may be, for example, distilled water, and in certain aspects, optionally deionized water. In various aspects, the lithiated-oxide powder may also be calcined at a temperature greater than or equal to about 200° C. to less than or equal to about 400° C., and in certain aspects, optionally about 400° C., for a time greater than or equal to about 2 hours to less than or equal to about 6 hours, and in certain aspects, optionally about 2 hours, to remove any adsorbed water. In this fashion, the lithiated-oxide powder that is admixed with the binder (for example, aqueous binder) to form the first, lithiated-oxide slurry as detailed above is substantially free of the precursor zeolite powder and/or zeolite material. By "substantially free" it is meant that the lithiated-oxide slurry includes less than or equal to about to about 1 wt. % of the zeolite material.

Various aspects of the inventive technology can be further understood by the specific examples contained herein. Specific non-limiting examples are provided for illustrative purposes only of how to make and use the compositions, devices, and methods according to the present teachings and, unless explicitly stated otherwise, are not intended to be a representation that given combinations have, or have not, been made or tested.

For example, comparative lithium-containing electrochemical cells are tested in a variety of environments. The comparative example electrochemical cells each comprise a negative electrode comprising graphite, a positive electrode comprising NMC622 ($Li(Ni_{0.6}Co_{0.2}Mn_{0.2})O_2$), and a separator disposed therebetween. The separator has a trilayer structure including polypropylene and polyethylene (PP/PE/PP) (CELGARD® 2320). Each electrochemical cell further includes a non-aqueous liquid electrolyte comprising 1.0 M $LiPF_6$ in a mixture (1:2 by mass) of ethylene carbonate (EC) and diethylene carbonate (DEC). As further detailed below with reference to FIGS. 3-4, electrochemical tests (e.g., charge/discharge cycles) are conducted at 50° C. and under a constant current (C/20 for initial formation cycles and C/6 for subsequent cycles) after each cell rested for about 6 hours.

EXAMPLE 1

Figure 3:
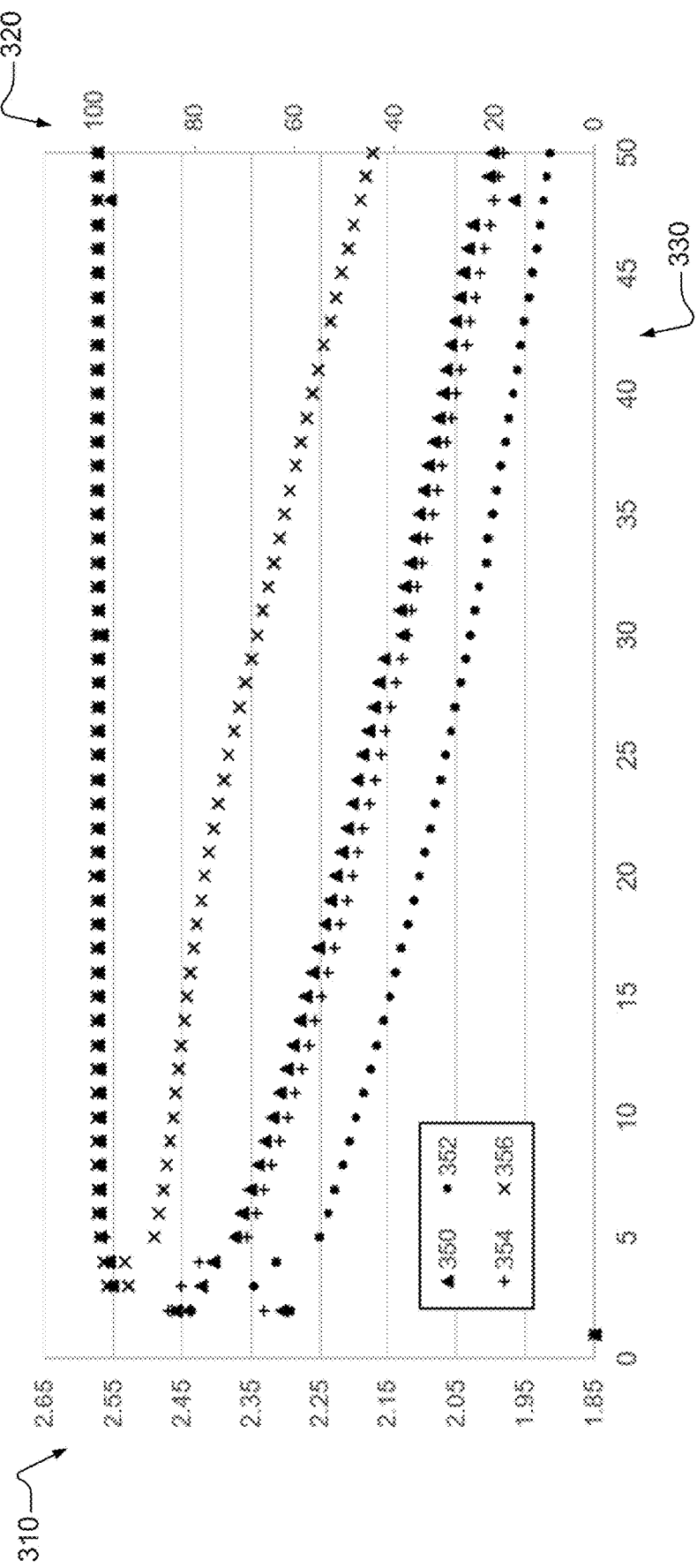
FIG. 3 is a chart illustrating the discharge capacities and Coulombic efficiencies of comparative electrochemical cells.

FIG. 3 compares the cycling performance of four comparative cells 350, 352, 354, and 356 over 50 cycles at 50° C. Each cell 350, 352, 354, and 356 is coated on a first side facing the first or positive electrode and on a second side facing the second or negative electrode. However, the comparative cells 350, 352, 354, and 356 each has a different coating composition. For example, the first comparative cell 350 comprises a separator that is not coated. The second comparative cell 352 comprises a separator having a silicon oxide ($SiO_2$) coating. The third comparative cell 354 comprises a separator having an aluminum oxide ($Al2O_3$) coating. The fourth comparative cell 356 comprises a separator having a lithium silicate ($Li_2SiO_3$) coating formed in accordance with various aspects of the present disclosure.

The $y_1$-axis 310 in FIG. 3 represents the discharge capacity (mAh $cm^{-2}$) of the cells 350, 352, 354, 356; the $y_2$-axis 320 represents the Coulombic efficiency (%) of the cells; and the x-axis 330 represents the cycle number. As illustrated, cell 356 having the ceramic-coated separator has superior capacity retention and Coulombic efficiency compared to cells 350, 352, and 354. For example, cell 356 has a capacity retention of 86.9% after 50 cycles. It is believed that the ceramic coating helps improve the cycle performance of the lithium battery, for example, by trapping trace water and scavenging hydrofluoric acid (HF) within the cell. For example, immobilizing trace water molecules within the cell may help prevent decomposition of the liquid electrolyte, which may in turn help prevent decomposition of the electroactive material of the positive electrode. Further, hydrofluoric acid may be generated in the cell during decomposition of the electrolyte, for example by reaction of the lithium salt (e.g., $LiPF_6$) with trace water. The as-produced hydrofluoric acid may increase the acidity of the electrolyte, such increase in acidity may lead to corrosion of the lithium-based intercalation host material of the electrodes and/or current collectors. As such, scavenging hydrofluoric acid may reduce degradation within the cell. More specifically, it is believed that the lithiated oxides trap protons to form, for example, one or more of $Li_xH_{4-x}SiO_4$, $LiHAl_2O_4$, and $Li_xH_{7-x}SiAlO_7$ such that water is not released into the electrolyte thereby minimizing hydrolysis of the lithium salt and related capacity decay.

EXAMPLE 2

Figure 4:
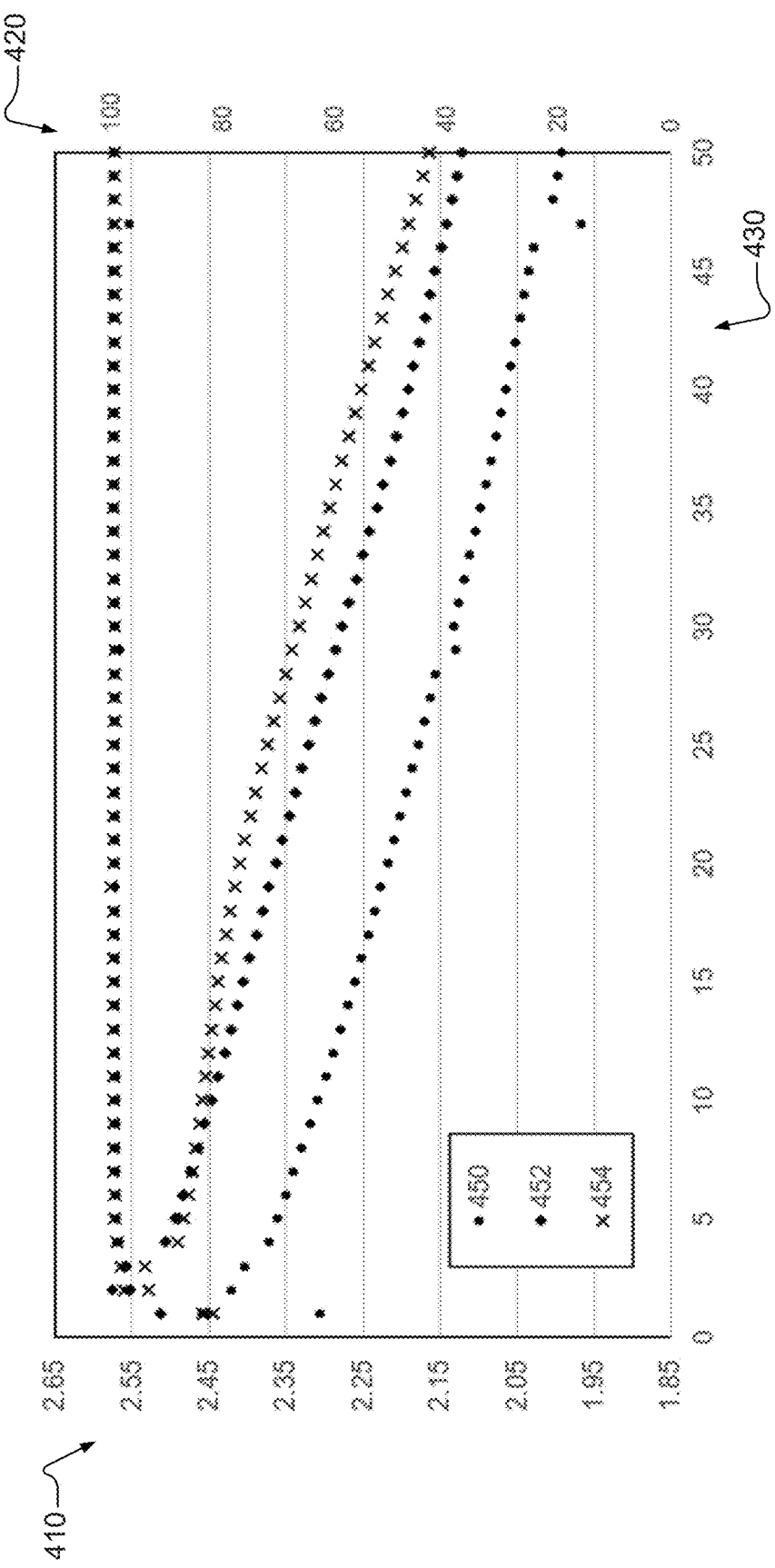
FIG. 4 is another chart illustrating the discharge capacities and Coulombic efficiencies of comparative cells.

FIG. 4 compares the cycling performance of three comparative cells 450, 452, and 454 over 50 cycles at 50° C. using an accelerating test. Each comparative cells 450, 452, and 454 is coated with the ceramic coating on a first side facing the first or positive electrode and on a second side facing the second or negative electrode. However, the comparative cells 450, 452, and 454 each has a different coating composition. For example, the first comparative cell 450 comprises a separator that is not coated. The second comparative cell 452 comprises a separator having a lithium-zeolite coating. The third comparative cell 454 comprises a separator having a lithium silicate ($Li_2SiO_3$) coating in accordance with various aspects of the present disclosure.

The $y_1$-axis 410 in FIG. 4 represents the discharge capacity (mAh $cm^{-2}$) of the cells 450, 452, 454; the $y_2$-axis 420 represents the Coulombic efficiency (%) of the cells; and the x-axis 430 represents the cycle number. As illustrated, cell 454 having the ceramic-coated separator has superior capacity retention and Coulombic efficiency compared to cells 450 and 452. For example, cell 454 has a capacity retention of 86.9% after 50 cycles. It is believed that the ceramic coating helps improve the cycle performance of the lithium battery, for example, by trapping trace water and scavenging hydrofluoric acid so as to suppress transitional metal dissolution within the cell.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of manufacturing a ceramic-coated separator for a lithium-containing electrochemical cell, the method comprising:
    admixing a powder comprising one or more lithiated oxides selected from the group consisting of $Li_2SiO_3$, $LiAlO_2$, $Li_2TiO_3$, $LiNbO_3$, $Li_3PO_4$, $Li_2CrO_4$, $Li_2Cr_2O_7$, and combinations thereof with a binder so as to form a slurry having a viscosity ranging from greater than or equal to about 300 cps to less than or equal to about 1400 cps at a temperature of about 25° C.;
    disposing the slurry onto one or more surfaces of a porous substrate to form an inorganic surface layer; and
    removing liquid from the inorganic surface layer by exposing the inorganic surface layer to a temperature greater than or equal to about 50° C. to less than or equal to about 100° C. for a time greater than or equal to about 6 hours to less than or equal to about 24 hours to form a ceramic coating on the one or more surfaces of the porous substrate so as to create the ceramic-coated separator.

2. The method of claim 1, wherein the slurry is a first slurry and the method further comprises:
    admixing a precursor zeolite powder with an aqueous solution comprising lithium hydroxide (LiOH) to form a second slurry; and
    promoting lithium-ion exchange between the precursor zeolite powder and the lithium hydroxide (LiOH) by subjecting the second slurry to a temperature greater than or equal to about 30° C. to less than or equal to about 100° C. for a time greater than or equal to about 6 hours to less than or equal to about 24 hours.

3. The method of claim 2, wherein the precursor zeolite powder includes one or more zeolite materials selected from the group consisting of zeolite A, zeolite X, zeolite Y, zeolite L, ZSM-5, zeolite beta, mordenite, ferrierite, and combinations thereof, and wherein the precursor zeolite powder has a cumulative total concentration of sodium and hydrogen that is less than a lithium hydroxide concentration of the aqueous solution.

4. The method of claim 2, wherein the precursor zeolite powder further comprises greater than about 1 wt. % to less than or equal to about 20 wt. % of sodium oxide ($NaO_2$).

5. The method of claim 2, wherein the method further includes, prior to the admixing of the powder with the binder, calcining the powder at a temperature greater than or equal to about 200° C. to less than or equal to about 400° C. for a time greater than or equal to about 2 hours to less than or equal to about 6 hours.

6. The method of claim 1, wherein the powder comprising one or more lithiated oxides comprises a plurality of particles and the method further includes comminuting the slurry with a grinding media so that the particles have an average diameter of less than or equal to about 1 μm.

7. The method of claim 6, wherein the grinding media comprises one or more materials selected from the group consisting of: zirconia, alumina, stainless steel, and combinations thereof.

8. The method of claim 1, wherein the slurry is disposed on the one or more surfaces of the porous substrate using a process selected from the group consisting of: spraying, brushing, dip coating, doctor-blade coating, spin coating, casting, printing, and combinations thereof.

9. The method of claim 1, wherein the slurry is disposed on the one or more surfaces of the porous substrate using a doctor-blade coating method having a blade gap of less than 30 μm.

10. The method of claim 1, wherein a weight ratio of the binder to the powder is greater than or equal to about 5% to less than or equal to about 30%, and wherein the binder is selected from the group consisting of: carboxymethyl cellulose (CMC), sodium alginate, polyacrylic acid (PAA), styrene-butadiene rubber (SBR), polyvinylidene fluoride (PVdF), and combinations thereof.

11. The method of claim 1, wherein the ceramic coating has a thickness of less than about 10 μm.

12. The method of claim 1, wherein the lithium-containing electrochemical cell comprising the ceramic-coated separator cycles at temperatures greater than or equal to about 50° C. and has a charge capacity loss of less than or equal to about 25% after 25 cycles of lithiation and delithiation.

13. A method of manufacturing a ceramic-coated substrate for a lithium-containing electrochemical cell, the method comprising:
    admixing a precursor zeolite powder with an aqueous solution comprising lithium hydroxide (LiOH) to form a zeolite slurry;
    exposing the zeolite slurry to a temperature greater than or equal to about 50° C. to less than or equal to about 100° C. for a time greater than or equal to about 6 hours to less than or equal to about 24 hours to form a lithiated-oxide powder, wherein the lithiated-oxide powder comprises one or more lithiated oxides selected from the group consisting of $Li_2SiO_3$, $LiAlO_2$, $Li_2TiO_3$, $LiNbO_3$, $Li_3PO_4$, $Li_2CrO_4$, $Li_2Cr_2O_7$, and combinations thereof;
    admixing the lithiated-oxide powder with a binder selected from the group consisting of: carboxymethyl cellulose (CMC), sodium alginate, polyacrylic acid (PAA), styrene-butadiene rubber (SBR), polyvinylidene fluoride (PVdF), and combinations thereof to form a lithiated-oxide slurry;
    disposing the lithiated-oxide slurry onto one or more surfaces of a substrate; and
    exposing the lithiated-oxide slurry to a temperature greater than or equal to about 50° C. to less than or equal to about 120° C. for a time greater than or equal to about 6 hours to less than or equal to about 24 hours to form a ceramic coating on the one or more surfaces of the substrate so as to create the ceramic-coated substrate, wherein the lithium-containing electrochemical cell comprising the ceramic-coated separator cycles at temperatures greater than or equal to about 50° C. and has a charge capacity loss of less than or equal to about 25% after 25 cycles of lithiation and delithiation.

14. The method of claim 13, wherein preparing the lithiated-oxide powder further includes contacting the lithiated-oxide powder with an aqueous liquid and calcining the lithiated-oxide powder at a temperature greater than or equal to about 50° C. to less than or equal to about 100° C. for a time greater than or equal to about 2 hours to less than or equal to about 6 hours.

15. The method of claim 13, wherein the precursor zeolite powder includes one or more zeolite materials selected from the group consisting of zeolite A, zeolite X, zeolite Y, zeolite L, ZSM-5, zeolite beta, mordenite, ferrierite, and combinations thereof, and wherein the precursor zeolite powder has a cumulative total concentration of sodium and hydrogen that is less than a lithium hydroxide concentration of the aqueous solution.

16. The method of claim 13, wherein the lithiated-oxide powder comprises a plurality of particles and the method further includes comminuting the slurry with a grinding media so that the particles have an average diameter of less than or equal to about 1 μm.

17. The method of claim 13, wherein the lithiated-oxide slurry has a viscosity ranging from greater than or equal to about 300 cps to less than or equal to about 1400 cps at a temperature of about 25° C.

18. The method of claim 13, wherein the lithiated-oxide slurry is disposed on the one or more surfaces of the porous substrate using a doctor-blade coating method having a blade gap of less than 30 μm.

19. The method of claim 13, wherein a weight ratio of the binder to the lithiated-oxide powder is greater than or equal to about 5% to less than or equal to about 30%.

* * * * *